(12) United States Patent
Jones et al.

(10) Patent No.: US 9,982,986 B2
(45) Date of Patent: May 29, 2018

(54) SYSTEM AND METHOD FOR CREATING AND UTILIZING A CONSTRUCTION AID

(71) Applicant: Bron Tapes Holding, Inc., Denver, CO (US)

(72) Inventors: Brett A. Jones, Aurora, CO (US); Michael G. Shand, Denver, CO (US); Leonard McLaughlin, Laguna Hills, CA (US)

(73) Assignee: BRON AEROTECH, INC., Denver, CO (US)

( * ) Notice: Subject to any disclaimer, the term of this patent is extended or adjusted under 35 U.S.C. 154(b) by 466 days.

(21) Appl. No.: 13/971,228

(22) Filed: Aug. 20, 2013

(65) Prior Publication Data

US 2014/0075737 A1  Mar. 20, 2014

Related U.S. Application Data

(60) Provisional application No. 61/691,046, filed on Aug. 20, 2012.

(51) Int. Cl.
  *G01B 5/14* (2006.01)
  *B64F 5/10* (2017.01)

(52) U.S. Cl.
  CPC ............. *G01B 5/14* (2013.01); *B64F 5/10* (2017.01); *Y10T 29/49947* (2015.01)

(58) Field of Classification Search
  CPC ... G01B 3/14; G01B 3/00; G01B 3/04; G01B 5/14; B64F 5/0009

USPC .................................................... 33/563, 566
See application file for complete search history.

(56) References Cited

U.S. PATENT DOCUMENTS

| | | | | |
|---|---|---|---|---|
| 4,659,409 A * | 4/1987 | Arafat | ...................... | B44C 1/04 156/249 |
| 4,965,943 A * | 10/1990 | Adams | ............................ | 33/758 |
| 5,107,601 A * | 4/1992 | Semchuck | ...................... | 33/759 |
| 5,922,157 A * | 7/1999 | Snider | ...................... | B25H 7/02 156/227 |
| 5,950,321 A * | 9/1999 | Pena et al. | ....................... | 33/758 |
| 6,317,996 B1 * | 11/2001 | Myers et al. | ................... | 33/566 |
| 6,430,834 B2 * | 8/2002 | Myers et al. | ................... | 33/566 |
| 6,615,505 B2 * | 9/2003 | Pierce | ............................ | 33/566 |
| 7,373,731 B2 * | 5/2008 | Nyberg | ........................... | 33/566 |
| 7,533,473 B2 * | 5/2009 | Chua | .............................. | 33/758 |
| 8,468,709 B2 * | 6/2013 | Akdeniz et al. | ................ | 33/563 |
| 2002/0100180 A1 * | 8/2002 | Montefusco | ................... | 33/563 |
| 2003/0115767 A1 * | 6/2003 | Wedekind et al. | ............. | 33/566 |
| 2003/0140513 A1 * | 7/2003 | Pierce | ............................ | 33/566 |
| 2003/0182815 A1 * | 10/2003 | Carlson, II | ..................... | 33/566 |

(Continued)

Primary Examiner — Yaritza Guadalupe-McCall
(74) Attorney, Agent, or Firm — Holzer Patel Drennan

(57) ABSTRACT

A system and method for creating and utilizing a construction aid for the construction of a mechanical structure is provided. Specifically, the disclosure may provide a visually transparent or semi-transparent, adhesive template capable of conforming to objects having curved and/or flat surfaces including indicia marked on portions thereof indicating, for example, the location, size, and type of fasteners to be used, or other construction information, is provided. The indicia may be comprised of lines and symbols of differing size, shape and color, as well as verbiage for additional assembly instructions. The adhesive template may be either visually or mechanically indexed to the mechanical structure.

18 Claims, 2 Drawing Sheets

(56) References Cited

U.S. PATENT DOCUMENTS

2008/0052941 A1* 3/2008 Nyberg ............................ 33/566
2008/0209749 A1* 9/2008 Chua ............................... 33/758
2009/0188124 A1* 7/2009 Chua ............................... 33/563
2014/0075737 A1* 3/2014 Jones et al. ................... 33/561.1
2014/0109425 A1* 4/2014 Brotman ......................... 33/759

* cited by examiner

SYSTEM AND METHOD FOR CREATING AND UTILIZING A CONSTRUCTION AID

TECHNICAL FIELD

The disclosure relates generally to a system and method for creating and utilizing a construction aid, such as a template, to aid in the construction of mechanical structures, and in particular, aerospace-related mechanical structures (such as aircraft). Specifically, the disclosure relates to a precision printed, adhesive template capable of conforming to mechanical structures having curved and/or flat surfaces including indicia marked on portions thereof indicating, for example, the location, size and or type of fasteners to be used, or other construction information. The indicia may be comprised of lines and symbols of differing size, shape and color, as well as verbiage for additional assembly instructions. In embodiments consistent with the disclosure, the template may be visually transparent and the template may be indexed to the mechanical structure undergoing construction either visually (i.e. printed feature of the template aligned to mechanical feature of the structure) or mechanically (i.e. physically pinned in two or more locations). In alternate embodiments, the template may be opaque or semi-transparent.

BACKGROUND

Production and assembly of formally designed and detailed mechanical structures, as in the production and assembly of aerospace-related structures (such as aircraft), is a documented, planned event. Designers, engineers and skilled laborers tasked to produce formally designed and detailed mechanical structures may follow the following general protocol, namely:

(1) create, review and modify product design specifications including component part definition drawings, assembly configuration definition drawings and Computer-Aided-Design (CAD) models, including applicable material and production process specifications;

(2) create and distribute sequenced, planned production and assembly documentation to empower skilled laborers to build-up the structure incorporating applicable material and production process specifications, and, including the definition of required tooling, whether commercially available or custom-designed, and, including a means to alter or update the production and assembly processes to incorporate necessary change resulting from issues such as design configuration change, engineering process change, material change, component parts shortage, tooling problems, equipment problems, and non-conformance issues; and (3) execute, in the specified order, planned production and assembly operations to complete the mechanical structure.

The work to create and distribute sequenced, planned production and assembly documentation for the build-up of mechanical structures of the type described herein results in what may be termed a "planning document" or "manufacturing planning document." The planning document, along with related product and process definition documents, when properly executed, defines both a production method for the mechanical structure as well as means to accept the work. Material and tooling necessary for build-up of the mechanical structure may be specified within the planning document, as well as pertinent material condition and tool configuration.

The planning document may contain discreet, properly sequenced, executable work instructions, often called "operations" with continuously evolving part/assembly configuration definitions. Within the planning document, the early operations may involve raw material and component parts of the mechanical structure, while the final operations may involve operations instructing ways to properly finish the mechanical structure. The discreet, sequenced, executable work instructions may be performed by automated equipment, man-operated machinery, the application of tooling or manpower, or any combination of these.

Current practice for assembly of space and aero-space mechanical structures generally requires an assembly foreman to read a set of engineering drawings, plans, or blueprints, to obtain the location of various sub-structural components (e.g. hole locations) on which to fasten or join materials (for example, wings, fuselage, etc). At various points of the assembly process, an assembly foreman may measure and mark the location of specific features or provide assembly instructions onto the various assembly parts using engineering drawings for product definition. Each measurement and marking is based on drawings that are either scaled or full-size, and may involve fractional dimensions that-may be applied cumulatively. These measurements and markings, when performed by workers of differing skill levels can sometimes result in undesired and costly errors, particularly where cumulative dimensions are involved.

As such, it is known to use certain types of templates in the construction of mechanical structures in the space and aero-space industry in order to attempt to minimize such errors. For example, U.S. Pat. No. 8,051,577 describes a fastener template for use in the construction of aero-space mechanical structures. Other known methods include the use of paint and full-size hoods or masks that fit over the mechanical structure and have pre-made holes to which paint is applied (either through spray or hand technique) thereby leaving the desired markings on the mechanical structure being created/worked on.

However, some of these prior art aero-space mechanical structure templates and/or marking techniques are not as useful and/or complete as could be desired because, among other limitations, for example, they are not visually transparent, they are not self-adhesive, they cannot remain in location throughout the assembly process, they prevent the installation of components when located on the workpiece, they cannot either be drilled or countersunk through when located on the workpiece, they do not provide a means for product acceptance, they do not conform easily to all of the curved portions of aero-space mechanical structures as might be desired, and/or require that the templates overlay existing pre-drilled holes to be used, and/or require the use of paint that is messy and physical tooling that is large and cumbersome and sometimes difficult to store and retrieve. Accordingly, it is desired to have a template for use in the construction of aero-space mechanical structures that alleviates at least some of these deficiencies in the prior art.

SUMMARY

The present disclosure provides a system and method for the transfer of product definition and configuration information, production and assembly sequence information, as well as production equipment and tooling settings information to skilled laborers engaged in production and assembly operations of mechanical structures. In aspects of the disclosure, the present disclosure may provide a visually transparent, full-scale, 1:1, precision printed resin sheet material forming a template that may be mechanically or visually indexed to and applied directly to component surfaces of the mechanical structure undergoing production and assembly using an integral, one-sided pressure-sensitive adhesive system.

DETAILED DESCRIPTION

Figure 1:
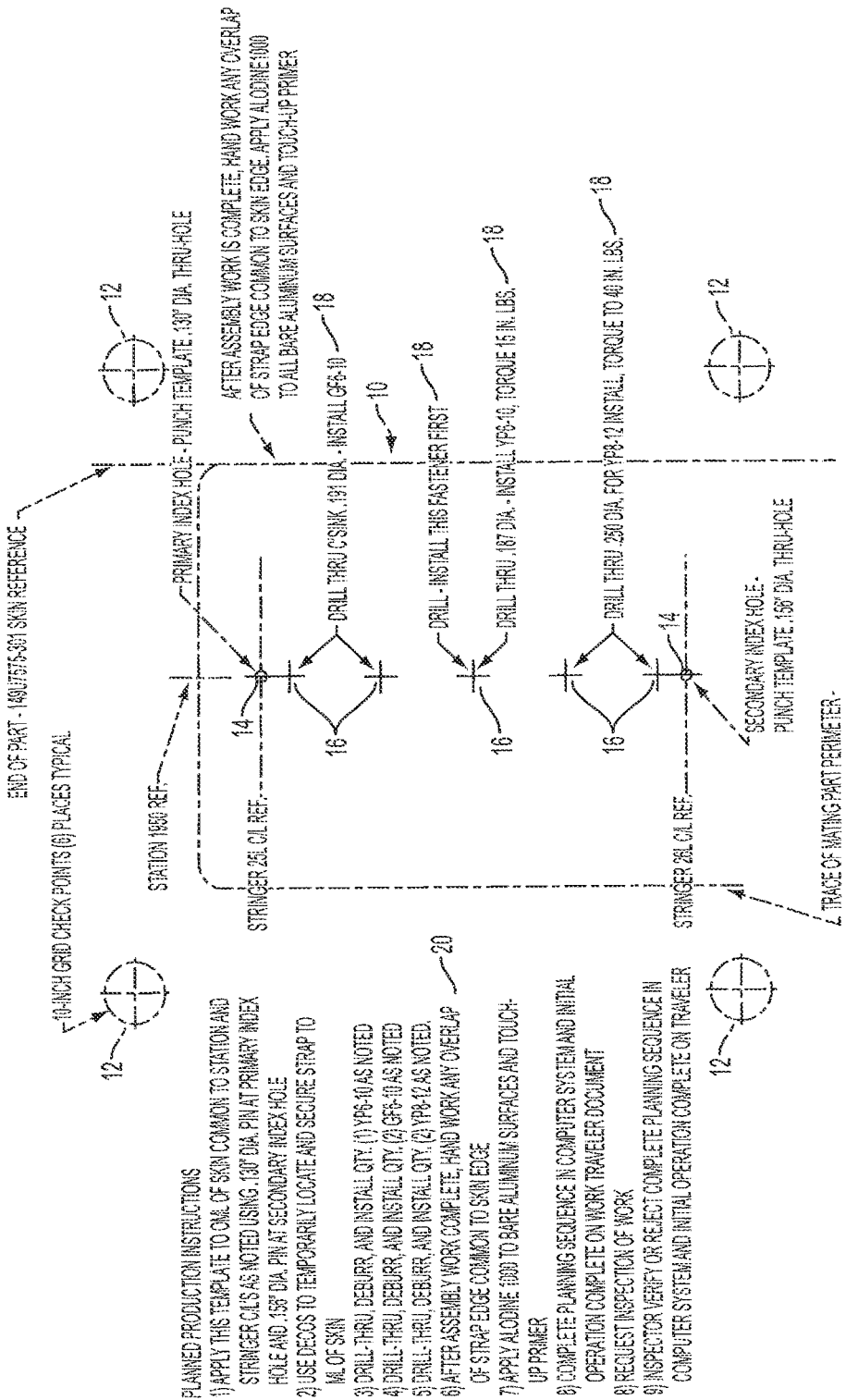
FIG. 1 is a plan view of an example of a template as may be printed on a resin sheet material having an adhesive thereon for use in accordance with an aspect of the present disclosure.

In the following description, the illustrative embodiments described are not meant to be limiting. Other embodiments may be utilized, and other changes may be made, without departing from the spirit or scope of the subject matter presented here. It will be readily understood that the aspects of the present disclosure, as generally described herein, may be arranged, substituted, combined, and designed in a wide variety of different configurations, all of which are contemplated and are part of this disclosure.

Specifically, the present disclosure provides a system and method for the transfer of product definition and configuration information, production and assembly sequence information, as well as production equipment and tooling settings information to skilled laborers engaged in production and assembly operations of mechanical structures.

More specifically, the present disclosure may combine visually transparent, full-scale, 1:1, precision printed resin sheet material that may be applied directly to component surfaces of the mechanical structure undergoing production and assembly using a pressure-sensitive adhesive system.

In an embodiment of the disclosure, the precision printed resin sheet may be a template that can be used individually to convey complete production and assembly information for simple part production and assembly operations for a mechanical structure to a laborer.

In an aspect of the disclosure, the template can also be used as a subset of the planning document to list and convey operational product definition and assembly information for complex mechanical structure production and assembly. In such an aspect, when the template is properly applied to component part surfaces of either simple or complex mechanical structures, the template is equivalent to and may replace production tooling as a means for establishing location of part and assembly features, both as a means of production as well as a means of product acceptance.

In another aspect of the disclosure, the template described herein may provide a means for the transfer of product definition and configuration information, production and assembly sequence information, as well as production equipment and tooling settings information to skilled laborers engaged in production and assembly operations of the mechanical structure. In such an aspect, the template may combine full-scale, 1:1, precision printed resin sheet material applied directly to component surfaces of the product undergoing production and assembly using pressure-sensitive adhesive system. In such an aspect, the template may be used individually to convey complete production and assembly information for simple part production and assembly operations. In accordance therewith, the template of the disclosure can also be used as a subset of the planning document to list and convey operational product definition and assembly information for complex mechanical structure production and assembly.

In an aspect, the template of the present disclosure may preferably be relatively easy to apply, may be relatively easy to remove, preferably leaves minimal or no residue on the mechanical structure being created and/or worked on, and may remain in location through all production and assembly operation. Also in an aspect, the template may tolerate drilling and machining, does not remove primer or temporary protective coatings located on the mechanical structure being created.

As will be apparent to those of ordinary skill in the art, while it is within contemplation of the present disclosure for the template to be provided in any known manner, in an embodiment, the template may be created by any of the following procedures, alone or in combination:

(1) Graphics/instruction that are hand drawn onto a resin sheet (or other appropriate material) and either scanned into a Computer-aided-design (CAD) program/computer or reconstructed by an engineer by hand (or an automated measurement reproduction system) to create an equivalent computer graphic drawing within the CAD system;

(2) CAD graphics/instruction for use in the creation of the mechanical structure in either two-dimensional (planar) or three-dimensional coordinate systems;

(3) Precision-printed graphic plotting (validated to the requirements of the product design and configuration).

In an aspect of the disclosure, the template may be made from resin sheet material with one-sided adhesive system meeting the requirements of the product design, providing temporary protection, clean removal with little or no residue, and which thereby provides a means to index or otherwise properly locate the precision-printed graphic resin sheet material onto the mechanical structure being worked on.

In other aspects of the present disclosure, template graphics may be prepared to locate as well as specify part or assembly feature characteristics, for example—a hole location, production tolerance for the hole, characteristics of the mating part to be installed in the hole. In such an aspect, the template graphics may be produced to full engineering tolerance at full scale, thereby improving on prior art methods and systems where graphics could not be produced to any specific scale and generally could not be precisely representative of details of the in-work mechanical structure or assembly thereof.

In another aspect of the disclosure, commercially available software may be used to convert 3D CAD graphics into flat-pattern (2D) CAD graphics. The 2D CAD may be printed onto the template media, verified to engineering tolerance, and then applied to the part or mechanical structure assembly in accordance with the disclosure.

In accordance with the present disclosure resin sheet material that may be used include resin sheets, such as Mylar, commercially available from Dupont, having an adhesive applied thereto. As would be apparent to those of ordinary skill in the art, other similar resin sheets available from suppliers such as Avery and/or 3M, are operable within aspects of the present disclosure. Those of ordinary skill will also understand that the use of such materials must be considered with respect to the specific requirements of certain manufacturers, and in particular, aero-space mechanical structure manufacturers.

In accordance with aspects of the disclosure, templates may be fastened to parts or assemblies of mechanical structures being created/worked on using visual best-fit, edge of part, or DA (Determinate Assembly, such as specified by an aircraft manufacturer such as Boeing or equivalent) hole/locating/mating hole methods.

As shown best in FIG. 1, an example template 10 in accordance with at least some aspects of the invention is shown. Specifically, the template 10 denotes (4) 10" grid points 12 arrayed across the template 10 sheet. In accordance with at least some aspects of the disclosure, as known to those of ordinary skill in the art, the template may be C-sized (standard 22"×17"). The template 10 includes two index holes 14 therein. The template 10 includes 5 locating points 16 thereon including details as to the location and instructions 18 for installing fasteners (not shown). In an exemplary application of the present disclosure, the template includes general overall instructions 20. While those instructions 20 as provided herein are merely exemplary, they read as follows:

Planned Production Instructions
1) Apply this template to OML (Outer Mold Line) of skin common to Station and Srtinger C/L's as noted using 0.130" dia pin at primary Index hole and 0.156" dia pin at secondary Index hole.
2) Use clecos to temporarily locate and secure strap to IML (Inner Mold Line) of skin.
3) Drill-thru, deburr, and install qty. (1) YP6-10 as noted.
4) Drill-thru, deburr, and install qty. (2) GF6-10 as noted.
5) Drill-thru, deburr, and install qty. (1) YP8-12 as noted.
6) After assembly work complete, hand work any overlap or strap edge common to skin edge.
7) Apply Alodine 1000 to all bare aluminum surfaces and touch-up primer.
8) Complete planning sequence in computer system and initial operation complete on work traveler document.
8) Request inspection of work.
9) Inspector verify or reject complete planning sequence in computer system and initial operation complete on traveler.

It is within the scope of the disclosure that various checks of the accuracy of the graphics (prior to plotting) and the template (after plotting) be completed as is known in the art. Specifically, graphic accuracy may be verified by the customer (see, e.g., upper right hand corner of FIG. 1). Similarly, after plotting, accuracy may be verified by a plot center operator in a plot accuracy stamp after plotting to assure template dimensional accuracy and by a user of the template prior to use (see, e.g. lower right hand corner of FIG. 1).

Figure 2:
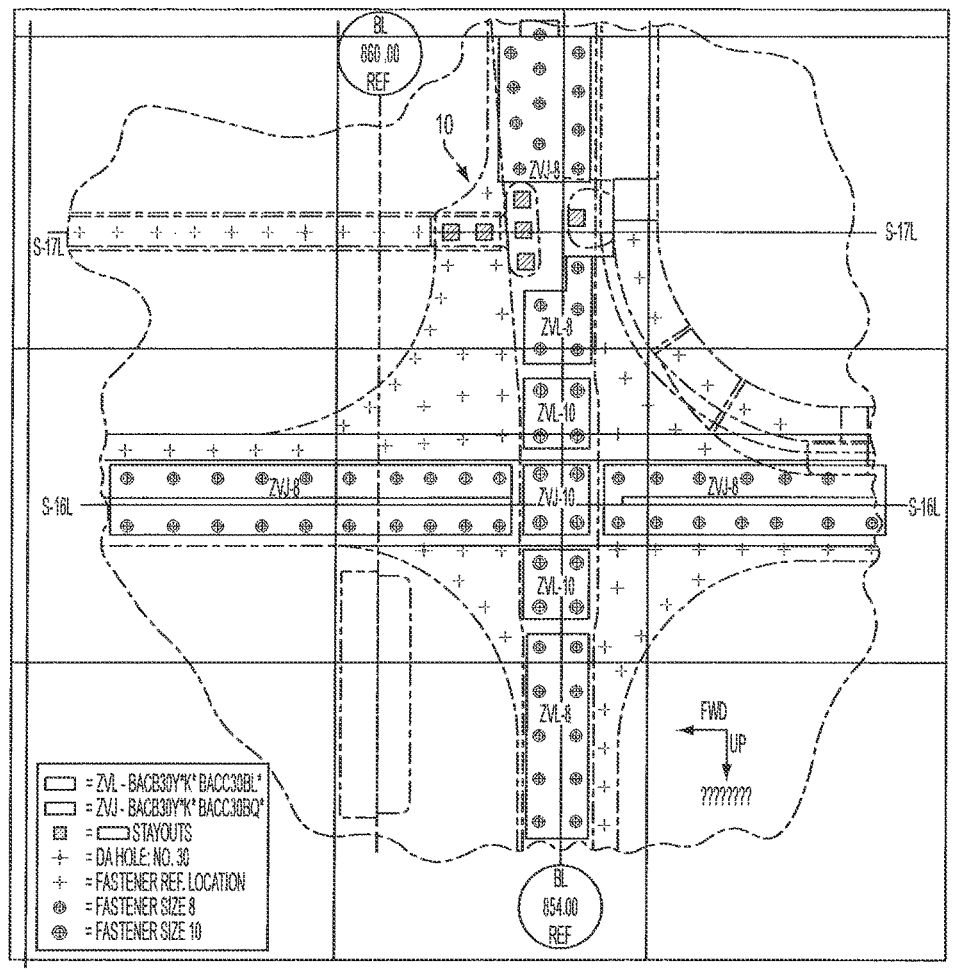
FIG. 2 is a plan view of an exemplary template for use in accordance with an aspect of the disclosure showing a template for use in the construction of a portion of an entryway door.

As can be seen in FIGS. 1 and 2, in accordance with some aspects of the disclosure, locations for indexing the template to the mechanical structure being created/worked on may be provided, as well as instruction and/or identification of primary and/or secondary index features. Additionally, other instructions, such as assembly sequence, planned production instructions, hand-work to be performed at the conclusion of assembly work, finishing requirements, etc. (via text and including or not including additional graphics) may be denoted as well. Similarly, the various size and type of fasteners may be identified by location and discriminated for common-size using common-color graphics or other features.

As discussed herein, and as will be readily ascertainable by those of ordinary skill in the art, the as-designed (i.e. blueprint) version of the assembly and components of a mechanical structure as discussed herein is not equivalent to the as-built and/or as-planned version of that structure. More specifically, in the blueprint version, some features which may have generally open tolerances, will, in production (and therefore in the planning document), require very tight tolerances. For example, a hole location used to index mating parts or otherwise provide a tooling reference location may be shown and/or described only functionally in the blueprint version, but will, based upon the actual build-up, require a very tight tolerance.

As such, utilizing a system and/or method in accordance with at least some aspects of the present invention does not simply involve the mechanical transfer of blueprint assembly drawings to a template sheet which may then be affixed to a mechanical structure for use in, for example, a completed aircraft. To the contrary, according to at least some aspects of the present invention, what is required is the combination of all of the drawings specifications, including the blueprints, by an operator such as a CAD engineer to provide all of the desired and/or necessary specifications to a single template that may then be utilized on the mechanical structure within the scope of the present invention.

Following from the above description it should be apparent to those of ordinary skill in the art that, while the systems, methods and apparatuses herein described constitute exemplary embodiments of the present disclosure, it is understood that the disclosure is not limited to these precise systems, methods and apparatuses and that changes may be made therein without departing from the scope of the disclosure.

What is claimed is:

1. A construction template for use in the construction of a mechanical structure comprising:
a sheet having a pressure sensitive adhesive applied to a portion thereof, said sheet including indicia thereon indicating type and location of fasteners to be placed therethrough, said sheet including a mechanical indexing feature including a first hole for being received on a first protrusion and a second hole for being received on a second protrusion from said mechanical structure.

2. The construction template of claim 1 wherein said sheet is one of transparent and semi-transparent.

3. The construction template of claim 1 wherein said sheet includes production assembly instructions thereon.

4. The construction template of claim 1 wherein said indicia are printed on said sheet through the use of Computer Aided Design software and a corresponding printer.

5. The construction template of claim 1 wherein said indicia are printed in multiple colors.

6. The construction template of claim 1 wherein said protrusion comprises a precision indexing pin.

7. The construction template of claim 1 wherein the mechanical structure being constructed is a portion of an aircraft.

8. The construction template of claim 1, wherein said indicia includes one or both of a visual checkpoint and an edge outline of said mechanical structure.

9. A construction template for use in the construction of an aircraft component comprising:
a sheet having a pressure sensitive adhesive applied to a portion thereof, said sheet including indicia thereon indicating type and location of fasteners to be placed therethrough and production assembly instructions thereon and including a mechanical indexing feature for indexing said sheet to said aircraft component being constructed, said mechanical indexing feature including a hole for being received on a protrusion from said aircraft component.

10. The construction template of claim 9 wherein said sheet is one of transparent and semi-transparent.

11. The construction template of claim 9 wherein said indicia are printed on said sheet through the use of Computer Aided Design software and a corresponding printer.

12. The construction template of claim 9 wherein said indicia are printed in multiple colors.

13. The construction template of claim 9 wherein said sheet is comprised of a resin.

14. The construction template of claim 9 further including additional indicia thereon comprising instructions for hand work to be completed at the end of assembly work.

15. The construction template of claim 9 wherein said aircraft component is curved and said sheet is shaped to conform thereto.

16. The construction template of claim 9, wherein said mechanical indexing feature further includes a second hole for being received on a second protrusion from said aircraft component.

17. The construction template of claim 9, wherein said indicia includes one or both of a visual checkpoint and an edge outline of said aircraft component.

18. A method for constructing a portion of an aircraft comprising:

selecting a construction template comprising a transparent resin sheet having a pressure sensitive adhesive applied to at least a portion thereof, said sheet including indicia thereon indicating the type and location of fasteners to be placed therethrough and production assembly instructions thereon;

indexing said construction template on said portion of said aircraft being constructed by placing said construction template over a mechanical indexing feature on said portion of said aircraft, said indexing feature including a hole for being received on a protrusion from said portion of said aircraft;

attaching said construction template to said portion of said aircraft being constructed by applying pressure thereto thereby causing said pressure sensitive adhesive to bond with said portion of said aircraft being constructed;

attaching fasteners to said portion of said aircraft being constructed as indicated by said indicia on said construction template in a manner as specified by said production assembly instructions.

* * * * *